United States Patent
Teague

(10) Patent No.: US 8,611,283 B2
(45) Date of Patent: Dec. 17, 2013

(54) METHOD AND APPARATUS OF USING A SINGLE CHANNEL TO PROVIDE ACKNOWLEDGEMENT AND ASSIGNMENT MESSAGES

(75) Inventor: Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 670 days.

(21) Appl. No.: 11/022,147

(22) Filed: Dec. 22, 2004

(65) Prior Publication Data

US 2005/0165949 A1  Jul. 28, 2005

Related U.S. Application Data

(60) Provisional application No. 60/540,119, filed on Jan. 28, 2004, provisional application No. 60/590,112, filed on Jul. 21, 2004, provisional application No. 60/590,538, filed on Jul. 23, 2004.

(51) Int. Cl.
    *H04W 4/00* (2009.01)

(52) U.S. Cl.
    USPC .......................................... 370/329; 370/341

(58) Field of Classification Search
    USPC .............. 370/389, 392, 310, 395.1, 338, 311, 370/473, 512; 455/422.1, 450
    See application file for complete search history.

(56) References Cited

U.S. PATENT DOCUMENTS

| | | | |
|---|---|---|---|
| 4,346,473 A | 8/1982 | Davis | |
| 4,617,657 A * | 10/1986 | Drynan et al. | 370/394 |
| 4,850,036 A | 7/1989 | Smith | |
| 5,282,222 A | 1/1994 | Fattouche et al. | |
| 5,408,496 A | 4/1995 | Ritz et al. | |
| 5,416,780 A | 5/1995 | Patel et al. | |
| 5,511,233 A | 4/1996 | Otten | |
| 5,519,730 A | 5/1996 | Jasper et al. | |
| 5,694,389 A | 12/1997 | Seki et al. | |
| 5,732,351 A * | 3/1998 | Olds et al. | 455/436 |
| 5,822,700 A | 10/1998 | Hult et al. | |
| 5,889,759 A | 3/1999 | McGibney | |

(Continued)

FOREIGN PATENT DOCUMENTS

| | | |
|---|---|---|
| CN | 1187930 | 7/1998 |
| CN | 1254223 A | 5/2000 |

(Continued)

OTHER PUBLICATIONS

Cumulative acknowledgement multicast repetition policy for wireless LANs or ad hoc network clusters; LE Miller—Communications, 2002. ICC 2002. IEEE 2002.*

(Continued)

*Primary Examiner* — Phirin Sam
(74) *Attorney, Agent, or Firm* — Charles E. Eggers

(57) ABSTRACT

A method and apparatus are provided for providing an acknowledgement (ACK) message combined with one or more communication message of a data packet that is transmitted using a single channel. The method comprising acts of associating the ACK with a channel ID of a recipient; building the ACK information data pattern, wherein the length of the ACK message is based on number of ACK messages to be transmitted; and combining the ACK information data pattern with one or more communication message by applying an encoding scheme over the combined message.

49 Claims, 6 Drawing Sheets

(56) References Cited

U.S. PATENT DOCUMENTS

| | | | |
|---|---|---|---|
| 5,920,547 A | 7/1999 | Werth | |
| 5,995,494 A * | 11/1999 | Horikawa | 370/310 |
| 6,005,852 A | 12/1999 | Kokko et al. | |
| 6,021,124 A | 2/2000 | Haartsen et al. | |
| 6,052,377 A | 4/2000 | Ohmi et al. | |
| 6,097,711 A | 8/2000 | Okawa et al. | |
| 6,104,926 A | 8/2000 | Hogg et al. | |
| 6,105,064 A * | 8/2000 | Davis et al. | 709/224 |
| 6,134,434 A * | 10/2000 | Krishnamurthi et al. | 455/419 |
| 6,141,550 A | 10/2000 | Ayabe et al. | |
| 6,157,839 A | 12/2000 | Cerwall et al. | |
| 6,172,971 B1 | 1/2001 | Kim | |
| 6,173,016 B1 | 1/2001 | Suzuki | |
| 6,188,717 B1 | 2/2001 | Kaiser et al. | |
| 6,263,205 B1 | 7/2001 | Yamaura et al. | |
| 6,285,665 B1 | 9/2001 | Chuah | |
| 6,333,937 B1 | 12/2001 | Ryan et al. | |
| 6,367,045 B1 | 4/2002 | Khan et al. | 714/748 |
| 6,369,758 B1 | 4/2002 | Zhang | |
| 6,377,587 B1 * | 4/2002 | Grivna | 370/474 |
| 6,377,809 B1 | 4/2002 | Rezaiifar et al. | |
| 6,430,412 B1 | 8/2002 | Hogg et al. | |
| 6,430,724 B1 | 8/2002 | Laneman et al. | |
| 6,447,210 B1 | 9/2002 | Coombs et al. | |
| 6,449,245 B1 | 9/2002 | Ikeda et al. | |
| 6,466,591 B1 | 10/2002 | See et al. | |
| 6,473,393 B1 | 10/2002 | Ariyavisitakul et al. | |
| 6,473,467 B1 | 10/2002 | Wallace et al. | |
| 6,477,210 B2 | 11/2002 | Chuang et al. | |
| 6,487,235 B2 | 11/2002 | Hoole | |
| 6,487,252 B1 | 11/2002 | Kleider et al. | |
| 6,505,253 B1 * | 1/2003 | Chiu et al. | 709/235 |
| 6,515,997 B1 | 2/2003 | Feltner et al. | |
| 6,522,886 B1 | 2/2003 | Youngs et al. | |
| 6,532,227 B1 | 3/2003 | Leppisaari et al. | |
| 6,532,256 B2 | 3/2003 | Miller | |
| 6,535,715 B2 | 3/2003 | Dapper et al. | |
| 6,545,997 B1 | 4/2003 | Bohnke et al. | |
| 6,549,561 B2 | 4/2003 | Crawford et al. | |
| 6,563,858 B1 | 5/2003 | Fakatselis et al. | |
| 6,567,374 B1 | 5/2003 | Bohnke et al. | |
| 6,567,397 B1 * | 5/2003 | Campana, Jr. et al. | 370/349 |
| 6,594,320 B1 | 7/2003 | Sayeed | |
| 6,597,680 B1 | 7/2003 | Lindskog et al. | |
| 6,597,745 B1 | 7/2003 | Dowling et al. | |
| 6,597,918 B1 | 7/2003 | Kim et al. | |
| 6,601,207 B1 | 7/2003 | Vanttinen | 714/748 |
| 6,603,801 B1 | 8/2003 | Andren et al. | |
| 6,618,454 B1 | 9/2003 | Agrawal et al. | |
| 6,633,616 B2 | 10/2003 | Crawford et al. | |
| 6,636,568 B2 | 10/2003 | Kadous et al. | |
| 6,643,281 B1 | 11/2003 | Ryan | |
| 6,654,429 B1 | 11/2003 | Li et al. | |
| 6,658,619 B1 | 12/2003 | Chen | 714/748 |
| 6,661,832 B1 | 12/2003 | Sindhushayana et al. | |
| 6,665,309 B2 * | 12/2003 | Hsu et al. | 370/441 |
| 6,674,792 B1 | 1/2004 | Sugita et al. | |
| 6,697,347 B2 | 2/2004 | Ostman et al. | |
| 6,700,865 B1 | 3/2004 | Yamamoto et al. | |
| 6,724,813 B1 | 4/2004 | Jamal et al. | |
| 6,731,614 B1 | 5/2004 | Ohlson et al. | |
| 6,741,634 B1 | 5/2004 | Kim et al. | |
| 6,751,187 B2 | 6/2004 | Walton et al. | |
| 6,801,564 B2 | 10/2004 | Rouphael et al. | |
| 6,813,478 B2 | 11/2004 | Glazko et al. | |
| 6,876,694 B2 | 4/2005 | Komatsu | |
| 6,878,694 B2 | 4/2005 | Doshi et al. | |
| 6,885,645 B2 | 4/2005 | Ryan et al. | |
| 6,888,805 B2 | 5/2005 | Bender et al. | |
| 6,907,246 B2 | 6/2005 | Xu et al. | |
| 6,909,761 B2 | 6/2005 | Kloos et al. | |
| 6,928,062 B2 | 8/2005 | Krishnan et al. | |
| 6,975,647 B2 | 12/2005 | Neale et al. | |
| 6,977,974 B1 | 12/2005 | Geraniotis et al. | |
| 6,990,142 B2 | 1/2006 | Chappaz et al. | |
| 6,996,195 B2 | 2/2006 | Kadous et al. | |
| 7,009,960 B2 | 3/2006 | Ho et al. | |
| 7,020,110 B2 | 3/2006 | Walton et al. | |
| 7,027,429 B2 | 4/2006 | Laroia et al. | |
| 7,027,523 B2 | 4/2006 | Jalali et al. | |
| 7,039,001 B2 | 5/2006 | Krishnan et al. | |
| 7,039,004 B2 | 5/2006 | Sun et al. | |
| 7,042,429 B2 | 5/2006 | Miyazawa et al. | |
| 7,042,857 B2 | 5/2006 | Krishnan et al. | |
| 7,042,869 B1 * | 5/2006 | Bender | 370/349 |
| 7,046,651 B2 | 5/2006 | Terry et al. | |
| 7,054,902 B2 * | 5/2006 | Toporek et al. | 709/203 |
| 7,058,134 B2 | 6/2006 | Sampath et al. | |
| 7,061,915 B2 | 6/2006 | Seidel et al. | |
| 7,061,916 B2 | 6/2006 | Herron et al. | |
| 7,062,276 B2 | 6/2006 | Xu et al. | |
| 7,068,703 B2 | 6/2006 | Maric | |
| 7,072,413 B2 | 7/2006 | Walton et al. | |
| 7,089,024 B2 | 8/2006 | Kim et al. | |
| 7,092,459 B2 | 8/2006 | Sendonaris et al. | |
| 7,099,296 B2 | 8/2006 | Belcea | |
| 7,099,299 B2 | 8/2006 | Liang et al. | |
| 7,099,622 B2 | 8/2006 | Meyer et al. | |
| 7,103,823 B2 | 9/2006 | Nemawarkar et al. | |
| 7,127,012 B2 | 10/2006 | Han et al. | |
| 7,133,460 B2 | 11/2006 | Bae et al. | |
| 7,139,320 B1 | 11/2006 | Singh et al. | |
| 7,177,297 B2 | 2/2007 | Agrawal et al. | |
| 7,181,170 B2 * | 2/2007 | Love et al. | 455/67.13 |
| 7,181,666 B2 | 2/2007 | Grob et al. | |
| 7,254,158 B2 | 8/2007 | Agrawal | |
| 7,280,467 B2 | 10/2007 | Smee et al. | |
| 7,283,559 B2 | 10/2007 | Cho et al. | |
| 7,310,336 B2 | 12/2007 | Malkamaki et al. | |
| 7,320,043 B2 | 1/2008 | Shatas et al. | |
| 7,366,272 B2 | 4/2008 | Kim et al. | |
| 7,376,422 B2 | 5/2008 | Yagihashi | |
| 7,411,895 B2 | 8/2008 | Laroia et al. | |
| 7,430,253 B2 | 9/2008 | Olson et al. | |
| 7,450,587 B2 | 11/2008 | Gruhn et al. | |
| 7,453,849 B2 | 11/2008 | Teague et al. | |
| 7,463,576 B2 | 12/2008 | Krishnan et al. | |
| 7,464,166 B2 * | 12/2008 | Larsson et al. | 709/228 |
| 7,474,686 B2 | 1/2009 | Ho | |
| 7,519,016 B2 | 4/2009 | Lee et al. | |
| 7,551,546 B2 | 6/2009 | Ma | |
| 7,630,403 B2 * | 12/2009 | Ho et al. | 370/473 |
| 7,631,247 B2 | 12/2009 | Petrovic et al. | |
| 7,778,337 B2 | 8/2010 | Tong et al. | |
| 2002/0034161 A1 | 3/2002 | Deneire et al. | |
| 2002/0034172 A1 | 3/2002 | Ho | |
| 2002/0041635 A1 | 4/2002 | Ma et al. | |
| 2002/0044540 A1 | 4/2002 | Mottier et al. | |
| 2002/0080902 A1 | 6/2002 | Kim et al. | |
| 2002/0097697 A1 | 7/2002 | Bae et al. | |
| 2002/0119784 A1 | 8/2002 | Agin et al. | |
| 2002/0122431 A1 | 9/2002 | Cho et al. | |
| 2002/0136273 A1 | 9/2002 | Hoole et al. | |
| 2002/0145968 A1 | 10/2002 | Zhang et al. | |
| 2002/0145970 A1 | 10/2002 | Han et al. | |
| 2002/0152315 A1 * | 10/2002 | Kagan et al. | 709/228 |
| 2002/0160781 A1 | 10/2002 | Bark et al. | |
| 2002/0196731 A1 | 12/2002 | Laroia et al. | |
| 2003/0012174 A1 | 1/2003 | Bender et al. | |
| 2003/0079022 A1 * | 4/2003 | Toporek et al. | 709/227 |
| 2003/0123481 A1 | 7/2003 | Neale et al. | 370/466 |
| 2003/0135640 A1 * | 7/2003 | Ho et al. | 709/237 |
| 2003/0161343 A1 | 8/2003 | Ghosh et al. | |
| 2003/0165131 A1 | 9/2003 | Liang et al. | |
| 2003/0169769 A1 * | 9/2003 | Ho et al. | 370/473 |
| 2003/0174662 A1 * | 9/2003 | Malkamaki | 370/310 |
| 2003/0174700 A1 * | 9/2003 | Ofek et al. | 370/389 |
| 2003/0214906 A1 * | 11/2003 | Hu et al. | 370/231 |
| 2003/0214930 A1 | 11/2003 | Fischer | |
| 2003/0227898 A1 | 12/2003 | Logalbo et al. | |
| 2003/0228865 A1 | 12/2003 | Terry et al. | |
| 2004/0001429 A1 | 1/2004 | Ma et al. | |
| 2004/0047298 A1 * | 3/2004 | Yook et al. | 370/254 |
| 2004/0062206 A1 | 4/2004 | Soong | |

(56) References Cited

U.S. PATENT DOCUMENTS

| | | |
|---|---|---|
| 2004/0082336 A1 | 4/2004 | Jami et al. |
| 2004/0095903 A1 | 5/2004 | Ryan et al. |
| 2004/0114552 A1 | 6/2004 | Lim et al. |
| 2004/0114566 A1* | 6/2004 | Lim et al. .................. 370/349 |
| 2004/0114618 A1 | 6/2004 | Tong et al. |
| 2004/0116125 A1 | 6/2004 | Terry et al. |
| 2004/0136445 A1 | 7/2004 | Olson et al. |
| 2004/0137863 A1 | 7/2004 | Walton et al. |
| 2004/0137943 A1* | 7/2004 | Tseng .................. 455/556.2 |
| 2004/0166869 A1* | 8/2004 | Laroia et al. ................ 455/450 |
| 2004/0170439 A1 | 9/2004 | Hironen |
| 2004/0184471 A1 | 9/2004 | Chuah et al. |
| 2004/0196871 A1* | 10/2004 | Terry ........................ 370/477 |
| 2004/0205105 A1* | 10/2004 | Larsson et al. ............ 709/200 |
| 2004/0213278 A1* | 10/2004 | Pullen et al. ............... 370/428 |
| 2004/0235472 A1 | 11/2004 | Fujishima et al. |
| 2004/0253968 A1 | 12/2004 | Chang et al. |
| 2004/0258134 A1 | 12/2004 | Cho et al. |
| 2005/0002355 A1* | 1/2005 | Takano ...................... 370/329 |
| 2005/0002369 A1 | 1/2005 | Ro et al. |
| 2005/0013263 A1* | 1/2005 | Kim et al. .................. 370/320 |
| 2005/0030473 A1* | 2/2005 | Wentink .................... 370/473 |
| 2005/0034049 A1* | 2/2005 | Nemawarkar et al. ...... 714/758 |
| 2005/0044439 A1* | 2/2005 | Shatas et al. ............... 713/400 |
| 2005/0069022 A1 | 3/2005 | Agrawal |
| 2005/0163194 A1 | 7/2005 | Gore et al. |
| 2005/0165949 A1* | 7/2005 | Teague ....................... 709/236 |
| 2005/0174931 A1 | 8/2005 | Krishnamoorthi |
| 2005/0190868 A1 | 9/2005 | Khandekar et al. |
| 2005/0254555 A1 | 11/2005 | Teague et al. |
| 2005/0272432 A1 | 12/2005 | Ji et al. |
| 2005/0281242 A1 | 12/2005 | Sutivong et al. |
| 2005/0281290 A1 | 12/2005 | Khandekar et al. |
| 2006/0034163 A1 | 2/2006 | Gore et al. |
| 2006/0034173 A1 | 2/2006 | Teague et al. |
| 2006/0045001 A1 | 3/2006 | Jalali |
| 2006/0114848 A1* | 6/2006 | Eberle et al. ................ 370/312 |
| 2006/0133308 A1 | 6/2006 | Madan et al. |
| 2006/0133522 A1 | 6/2006 | Sutivong et al. |
| 2006/0153239 A1 | 7/2006 | Julian et al. |
| 2006/0164993 A1 | 7/2006 | Teague et al. |
| 2006/0203932 A1 | 9/2006 | Palanki et al. |
| 2006/0209927 A1 | 9/2006 | Khandekar et al. |
| 2006/0218302 A1* | 9/2006 | Chia et al. .................. 709/245 |
| 2006/0221810 A1 | 10/2006 | Vrcelj et al. |
| 2006/0279435 A1 | 12/2006 | Krishnan et al. |
| 2007/0206623 A1* | 9/2007 | Tiedemann et al. .......... 370/431 |
| 2007/0211790 A1 | 9/2007 | Agrawal et al. |
| 2008/0075184 A1* | 3/2008 | Muharemovic et al. ...... 375/260 |
| 2008/0137603 A1 | 6/2008 | Teague et al. |
| 2008/0137652 A1 | 6/2008 | Herrmann et al. |
| 2009/0245421 A1* | 10/2009 | Montojo et al. ............. 375/298 |
| 2010/0002570 A9 | 1/2010 | Walton et al. |
| 2010/0034164 A1* | 2/2010 | Ho et al. .................... 370/329 |
| 2010/0182911 A1* | 7/2010 | Pullen et al. ................ 370/241 |
| 2011/0064039 A1 | 3/2011 | Sutivong et al. |
| 2011/0145584 A1* | 6/2011 | Coburn et al. ............... 713/176 |
| 2011/0235685 A1 | 9/2011 | Sutivong et al. |
| 2011/0282999 A1 | 11/2011 | Teague et al. |
| 2012/0087336 A1 | 4/2012 | Sutivong et al. |

FOREIGN PATENT DOCUMENTS

| | | |
|---|---|---|
| CN | 1345518 A | 4/2002 |
| CN | 1394394 A | 1/2003 |
| DE | 19701011 C1 | 6/1998 |
| DE | 19747369 A1 | 5/1999 |
| EP | 0658028 | 6/1995 |
| EP | 0768806 | 4/1997 |
| EP | 0917316 | 5/1999 |
| EP | 1039683 | 9/2000 |
| EP | 1043861 | 6/2002 |
| EP | 1265411 | 12/2002 |
| EP | 1286491 | 2/2003 |
| EP | 1513272 A1 | 3/2005 |
| EP | 1919152 A2 | 5/2008 |
| GB | 2350753 A | 12/2000 |
| JP | 04127738 | 4/1992 |
| JP | 04367135 | 12/1992 |
| JP | 07327248 | 12/1995 |
| JP | 09233047 | 9/1997 |
| JP | 09266466 | 10/1997 |
| JP | 10336159 | 12/1998 |
| JP | 11113049 | 4/1999 |
| JP | 11261623 A | 9/1999 |
| JP | 11331121 | 11/1999 |
| JP | 11346203 | 12/1999 |
| JP | 2000013353 A | 1/2000 |
| JP | 2000111631 A | 4/2000 |
| JP | 2000504908 T | 4/2000 |
| JP | 2000201134 A | 7/2000 |
| JP | 2000252947 | 9/2000 |
| JP | 2000278207 A | 10/2000 |
| JP | 2001036497 A | 2/2001 |
| JP | 2002111624 A | 4/2002 |
| JP | 2002111631 A | 4/2002 |
| JP | 2002141837 A | 5/2002 |
| JP | 2002152167 | 5/2002 |
| JP | 2002152169 A | 5/2002 |
| JP | 2002158631 A | 5/2002 |
| JP | 2002514368 A | 5/2002 |
| JP | 2002164867 A | 6/2002 |
| JP | 2003060645 A | 2/2003 |
| JP | 2003060655 | 2/2003 |
| JP | 2003078565 | 3/2003 |
| JP | 2003218826 A | 7/2003 |
| JP | 2003520499 T | 7/2003 |
| JP | 2003528527 A | 9/2003 |
| JP | 2004007353 A | 1/2004 |
| JP | 2004159345 A | 6/2004 |
| JP | 2004529524 A | 9/2004 |
| JP | 2004312291 A | 11/2004 |
| JP | 2004537875 A | 12/2004 |
| JP | 2005508103 T | 3/2005 |
| JP | 2005512458 T | 4/2005 |
| JP | 2005536103 | 11/2005 |
| JP | 2006505229 | 2/2006 |
| KR | 030017401 | 3/2003 |
| RU | 2111619 | 5/1998 |
| RU | 2150174 C1 | 5/2000 |
| RU | 2180159 C2 | 2/2002 |
| RU | 2335852 C2 | 10/2008 |
| TW | 508922 | 11/2002 |
| WO | WO9210890 | 6/1992 |
| WO | 9408432 | 4/1994 |
| WO | 9730526 | 8/1997 |
| WO | WO9814026 | 4/1998 |
| WO | WO9914878 | 3/1999 |
| WO | 9943114 | 8/1999 |
| WO | 9944316 | 9/1999 |
| WO | WO9966748 A1 | 12/1999 |
| WO | 0161902 | 8/2001 |
| WO | 0176110 | 10/2001 |
| WO | 0203556 | 1/2002 |
| WO | 0237887 | 5/2002 |
| WO | WO0241548 A1 | 5/2002 |
| WO | 0249306 | 6/2002 |
| WO | WO0249306 A2 | 6/2002 |
| WO | WO02049305 A2 | 6/2002 |
| WO | 02073831 A1 | 9/2002 |
| WO | 03019852 | 3/2003 |
| WO | 03021829 | 3/2003 |
| WO | WO03034645 | 4/2003 |
| WO | WO2004015946 A1 | 2/2004 |
| WO | WO2004040813 A1 | 5/2004 |
| WO | WO2004073219 A1 | 8/2004 |
| WO | WO2004079937 A2 | 9/2004 |
| WO | 2004102815 A2 | 11/2004 |
| WO | 2004102816 A2 | 11/2004 |
| WO | 2006022876 | 3/2006 |

(56) References Cited

FOREIGN PATENT DOCUMENTS

OTHER PUBLICATIONS

Performance improvement of TCP in wireless cellular network based on acknowledgement control; M Miyoshi, M Sugano—Proceedings of the 7th Asia-Pacific 2001.*
International Search Report—PCT/US2005/002545—International Search Authority—European Patent Office—Oct. 11, 2005.
Written Opinion—PCT/US2005/002545—International Search Authority—European Patent Office—Oct. 11, 2005.
International Preliminary Report on Patentability—PCT/US2005/002545—International Preliminary Examining Authority—IPEA/US—Aug. 2, 2006.
Gromakov, Ju.A., "Standards and Systems of Mobile Communications (Mobile Radio Communication Standards and Systems)" Moscow: Mobilnye Telesistemy—Eko Trands, 1997, pp. 59-61.
Elkashlan M. et al, Performance of Frequency-Hopping Multicarrier CDMA on a Uplink with Conference Proceedings, San Francisco, CA Dec. 1-5, 2003, IEEE Global Telecommunications Conference, NY, NY, IEEE, US, vol. 7 of 7, pp. 3407-3411.
Hui Won Je et al, "A Novel Multiple Access Scheme for Uplink Cellular Systems 1," Vehicular Technology Conference, VTC2004-fall, 2004 IEEE 60th Los Angeles, CA, US, Sep. 26-29, 2004, Piscataway, NY, pp. 984-988.
Tonello A.M. et al. "An Asynchronous Multitone Multiuser Air Interface for High-speed Uplink Communications." Vehicular Technology Conference, VTC 2003 Fall, 2003 IEEE 58th, Orlando, FL, US Oct. 6-9, 2003, Piscataway, NJ, US, IEEE, US.
Roa, et al., "Resource Allocation and Fairness for downlink shared Data channels", Mar. 16-20, 2003, 2003 IEEE. Wireless Communication and Networking, 2003 WCNC 2003, pp. 1049-1054.
"A Time and Frequency Synchronization Scheme for Multiuser OFDM" by JJ Van De Beek et al., IEEE Journal of Selected Areas in Communications, vol. 17, No. 11, pp. 1900-1914, Published in Nov. 1999.
IEEE Communications Magazine, Apr. 2002, David Falconer et al., Frequency Domain Equalization for Single-Carrier Broadband Wireless Systems, pp. 58-66.
Kapoor, S. et al., "Pilot assisted synchronization for wireless OFDM systems over fast time varying fading channels," Vehicular Technology Conference, 1998. VTC 98. 48th IEEE, May 18, 1998, vol. 3, pp. 2077-2080.
Technical Specification Group Radio Access Network: "3GPP TR25.848 V4.0.0 Physical Layer Aspects of UTRA High Speed Downlink Packet Access (Release 4)" 3GPP TR 25.848 V4.0.0, Mar. 2001, pp. 1-89, XP002189517.
Van De Beek J-J et al: "On Channel Estimation in OFDM Systems" Proceedings of the Vehicular Technology Conference. Chicago, Jul. 25-28, 1995, New York, IEEE, US, vol. 2 Conf. 45, pp. 816-819, XP000551647 ISBN: 0-7803-2743-8 p. 816, left-hand col., line 20—p. 817, left-hand col., line 23 p. 818, right-hand col., line 3—line 20 figure 5.
Yasunori Matsui et al., "A Study on Adaptive Uplink Resource Control Scheme for Asymmetric Packet Radio Communication Systems using OFDMA/TDD Technique," Technical Report of IEICE, Nov. 10, 2000, vol. 100, No. 435, pp. 63-70, RCS 2000-172 (Abstract).
Zhongren Cao et al., "Analysis of two receiver schemes for interleaved OFDMA uplink," Signals, Systems and Computers. Conference Record of the Thirty-Sixth Asilomar Conference on, Nov. 3, 2002, vol. 2, pp. 1818-1821.
Taiwan Search Report—TW093113201—TIPO—Apr. 26, 2011.
Coleri, S. et al: "Channel Estimation Techniques Based on Pilot Arrangement in OFDM Systems," IEEE Transactions on Broadcasting, Sep. 1, 2002, pp. 223-229, vol. 48, No. 3, IEEE Service Center, XP011070267, ISSN: 0018-9316.
Zhao et al., "A novel channel estimation method for OFDM mobile communication systems based on pilot signals and transform-domain processing" Vehicular Technology Conference, 1997, IEEE 47th Phoenix, AZ, USA May 4-7, 1997, New York, NY, USA, IEEE, US, vol. 3, May 4, 1997, pp. 2089-2093, XP010229166 ISBN: 0-7803-3659-3.
Cai, X., et al., "Group-orthogonal multi-carrier CDMA", Military Communications Conference. Milcom 2002. Proceedings. Anaheim, CA, Oct. 7-10, 2002; [IEEE Military Communications Conference], New York, NY: IEEE; US, vol. 1, Oct. 7, 2002, pp. 596-601, XP010632171, DOI: 10.1109/MILCOM.2002.1180511 ISBN: 978-0/7803-7625-0, Sections I-III.
Xu, Y., et al., "Group-orthogonal OFDMA in fast time-varying frequency-selective fading environments", 2004 IEEE 60th Vehicular Technology Conference. VTC2004-Fall (IEEE Cat. No. 04CH37575) IEEE Piscataway, NJ, USA, IEEE, vol. 1, Sep. 26, 2004, pp. 488-492, XP010788423, DOI: 10.1109/VETECF.2004.1400054 ISBN: 978-0/7803-8521-4, abstract, Sections I and III.

* cited by examiner

METHOD AND APPARATUS OF USING A SINGLE CHANNEL TO PROVIDE ACKNOWLEDGEMENT AND ASSIGNMENT MESSAGES

CROSS-REFERENCE TO RELATED APPLICATIONS

This application claims priority to U.S. Provisional Application Ser. No. 60/540,119, entitled "Combination of Assignment and Acknowledgement Channels in a Communication System," filed Jan. 28, 2004, and U.S. Provisional Application Ser. No. 60/590,112, entitled "Erase Signature for Sticky Assignments," filed Jul. 21, 2004, and U.S. Provisional Application Ser. No. 60/590,538, entitled "Flexible OFDM Transmission Formats via SYNC Channel," filed Jul. 23, 2004, all of which are assigned to the assignee hereof and hereby expressly incorporated by reference herein.

REFERENCE TO CO-PENDING APPLICATIONS FOR PATENT

This application is related to the following co-pending U.S. patent applications: U.S. application Ser. No. 10/340,507, filed Jan. 10, 2003 and U.S. application Ser. No. 10/726,944, filed Dec. 3, 2003, both of which are assigned to the assignee hereof, and expressly incorporated herein by reference.

BACKGROUND

1. Field

The present invention relates generally to communication and more specifically to techniques for combining acknowledgement (ACK) message with assignment message and transmitting both messages using a single channel.

2. Background

Wireless communication systems are widely deployed to provide various types of communication such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. Typically, a wireless communication system comprises several base stations, wherein each base station (or access point) communicates with the mobile station using a forward link (FL) and each mobile station (or access terminal) communicates with base station using a reverse link (RL).

Most of the communication system described above use a forward link and a reverse link in conjunction with a Hybrid Automatic Repeat Request (H-ARQ) scheme to communicate data and other information. H-ARQ techniques have been shown to provide significant improvement in capacity. With Hybrid ARQ, a packet is sent using multiple transmissions. The packet transmission could be terminated early if the receiver can decode the packet prior to receiving all the transmission. However, in order for early termination, the receiver (or recipient) must provide some acknowledgement that the data was received properly. Generally ACK or not ACK (NACK) messages are used to provide such acknowledgement to the transmitting entity (or sender). In a typical system, a separate ACK channel is established on forward and reverse link which is then used to provide the ACK/NACK messages to the sender. However, since ACK messages are very small (1-2 bits), it is extremely expensive to encode and CRC protect individual ACK messages to achieve the required reliability. This is especially true since the number of ACKs increase as the number of user using the reverse link increase. In order to keep up with the throughput, the system would need to adjust the resources. It is burdensome and at times inefficient to separately encode each ACK message and dedicate a channel for transmitting the ACK messages.

Thus, there is a need for a system and method to provide acknowledgement to the sender efficiently to combine the ACK messages with other communication between transmitter and receiver without using a dedicated resource.

BRIEF SUMMARY

Accordingly, a method and apparatus are provided for providing an acknowledgement (ACK) message combined with one or more communication message of a data packet that is transmitted using a single channel. The method comprising acts of associating the ACK with a channel ID of a recipient; building the ACK information data pattern, wherein the length of the ACK message is based on number of ACK messages to be transmitted; and combining the ACK information data pattern with one or more communication message by applying an encoding scheme over the combined message.

A more complete appreciation of all the advantages and scope of the invention can be obtained from the accompanying drawings, the description and the appended claims.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs. The word "listening" is used herein to mean that an electronic device is receiving and processing data received on a given channel.

Figure 1:
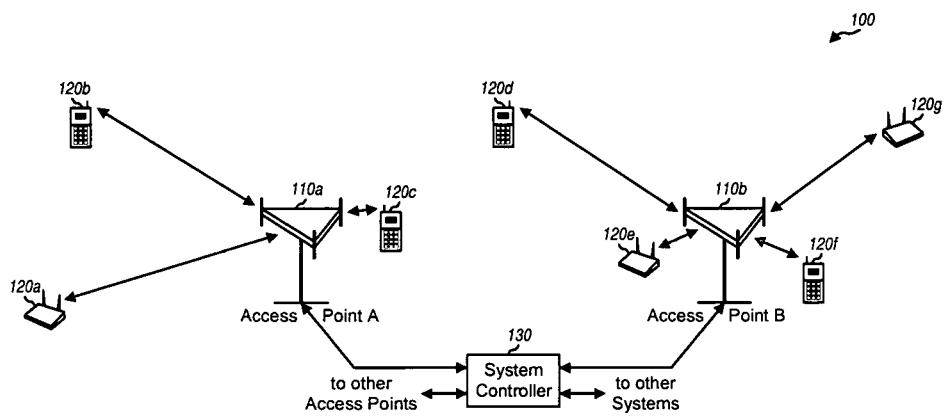
FIG. 1 shows a diagram of a wireless multiple-access communication system.

FIG. 1 shows a diagram of a wireless multiple-access communication system 100 that employs multi-carrier modulation. System 100 includes a number of access points, for example 110a and 110b that communicate with a number of access terminal 120a-120g. For simplicity, only two access points 110a and 110b and only seven access terminals 120a-120g are shown in FIG. 1. For purpose of discussion, when referring to a single access terminal (AT) 120x is used and when referring to a single access point (AP) 110x will be used (access terminal 120x and access point 110x are described in FIG. 2, infra).

An access point 110x, is an electronic device configured to communicate with one or more user access terminals and may also be referred to as a base station, base terminal, fixed terminal, a fixed station, base station controller, a controller, transmitter or some other terminology. The access point, base terminal, and base station are interchangeably used in the description below. The access point may be a general purpose computer, a standard laptop, a fixed terminal, an electronic device configured to transmit, receive and process data according to air interface methods defined by an OFDMA, CDMA, GSM, WCDMA, etc. system, or an electronic module comprising one or more computer chips controlled by a controller or a processor for transmitting, receiving and processing data according to air interface methods defined by an OFDMA, CDMA, GSM, WCDMA, etc.

An access terminal 120x, is an electronic device configured to communicate with the access point via a communication link. The access terminal may also be referred to as a terminal, a user terminal, a remote station, a mobile station, a wireless communication device, recipient terminal, or some other terminology. The access terminal, mobile terminal, user terminal, terminal are interchangeably used in the description below. Each access terminal 120x may communicate with one or multiple access points on the downlink and/or uplink at any given moment. The downlink (i.e., forward link) refers to transmission from the access point to the access terminal 120x, and the uplink (i.e., reverse link) refers to transmission from the access terminal 120x to the access point. The access terminal 120x may be any standard laptop, personal electronic organizer or assistant, a mobile phone, cellular phone, an electronic device configured to transmit, receive and process data according to air interface methods defined by an OFDMA, CDMA, GSM, WCDMA, etc. system, or an electronic module comprising one or more computer chips controlled by a controller or a processor for transmitting, receiving and processing data according to air interface methods defined by an OFDMA, CDMA, GSM, WCDMA, etc. system.

A system controller 130 couples to the access points and may further couple to other systems/networks (e.g., a packet data network). System controller 130 provides coordination and control for the access points coupled to it. Via the access points, system controller 130 further controls the routing of data among the access terminals, and between the access terminals and other users coupled to the other systems/networks.

The techniques described herein for optimizing portions of a frame may be implemented in various wireless multiple-access multi-carrier communication systems. For example, system 100 may be an OFDMA, CDMA, GSM, WCDMA, etc. system that utilizes data transmission.

Figure 2:
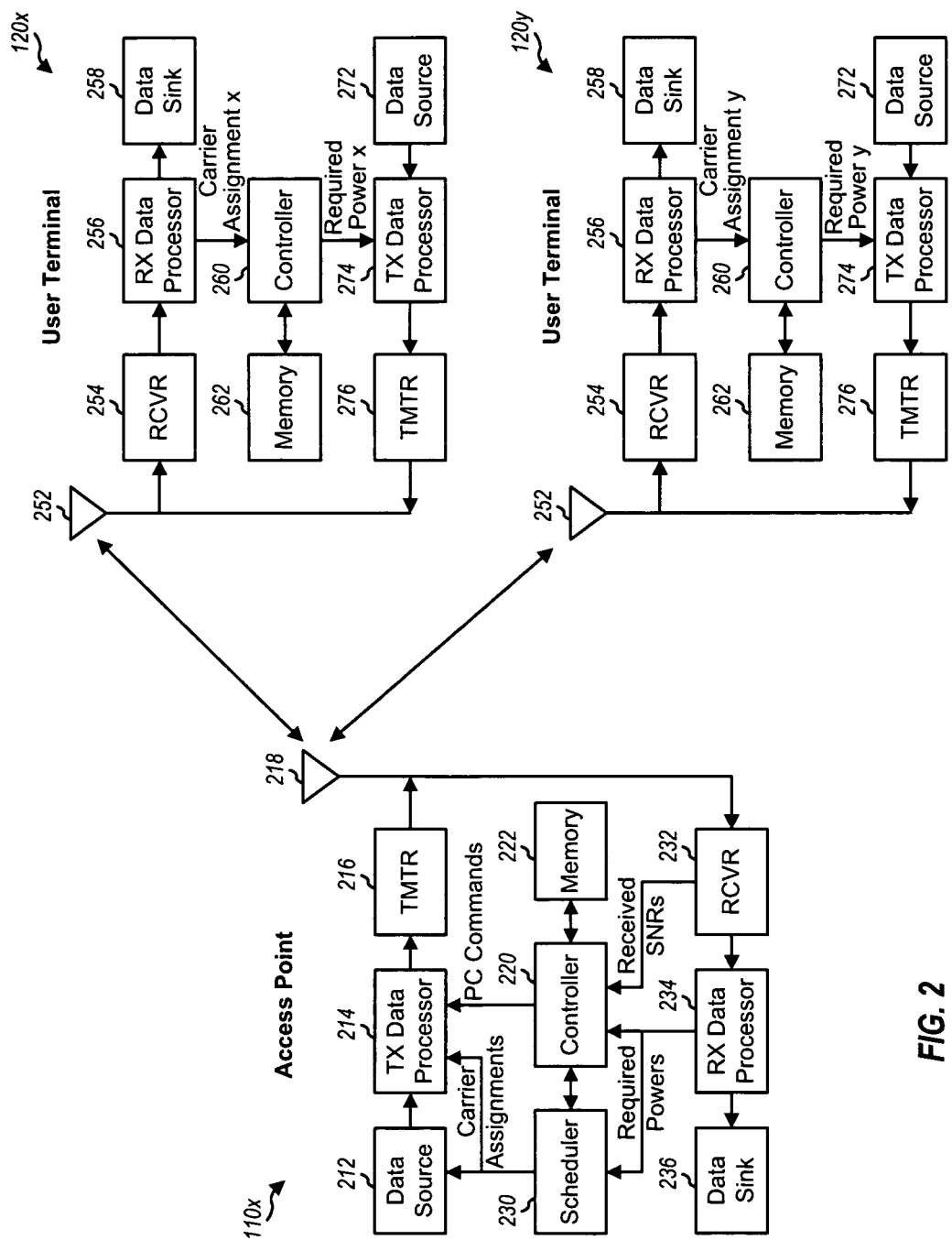
FIG. 2 shows a block diagram of an embodiment of an access point and two access terminals.

FIG. 2 shows a block diagram of an embodiment of an access point 110x and two access terminals 120x and 120y (or user terminals) in multiple-access multi-carrier communication system 100. At access point 110x, a transmit (TX) data processor 214 receives traffic data (i.e., information bits) from a data source 212 and signaling and other information from a access point 110x, and a schedule from a scheduler 230. For example, access point 110x may provide power control (PC) commands that are used to adjust the transmit power of the active access terminals, and scheduler 230 may provide assignments of carriers for the access terminals. These various types of data may be sent on different transport channels. The access point 110x may be configured to execute the process 500, for combining an ACK message with other communication messages, discussed below. TX data processor 214 encodes and modulates the received data using multi-carrier modulation (e.g., OFDM) to provide modulated data (e.g., OFDM symbols). A transmitter unit (TMTR) 216 then processes the modulated data to generate a downlink modulated signal that is then transmitted from an antenna 218.

At each of access terminals 120x and 120y, the transmitted signal is received by an antenna 252 and provided to a receiver unit (RCVR) 254. Receiver unit 254 processes and digitizes the received signal to provide samples. A received (RX) data processor 256 then demodulates and decodes the samples to provide decoded data, which may include recovered traffic data, messages, signaling, and so on. The traffic data may be provided to a data sink 258, and the carrier assignment and PC commands sent for the access terminal 120x are provided to a controller 260.

Controller 260 executes process 600, discussed below, to process a message having combined ACK and other communication information received on single channel and extract ACK information from the received message to determine if an ACK of itself was received.

The controller 260 also, directs data transmission on the uplink using the specific carriers that have been assigned to the access terminal 120x and indicated in the received carrier assignment. Controller 260 further adjusts the transmit power used for the uplink transmissions based on the received PC commands.

For each active access terminal 120x, a TX data processor 274 receives traffic data from a data source 272 and signaling and other information from controller 260. For example, controller 260 may provide information indicative of the required transmit power, the maximum transmit power, or the difference between the maximum and required transmit powers for the access terminal 120x. The various types of data are coded and modulated by TX data processor 274 using the assigned carriers and further processed by a transmitter unit 276 to generate an uplink modulated signal that is then transmitted from antenna 252.

At access point 110x, the transmitted and modulated signals from the access terminals are received by antenna 218, processed by a receiver unit 232, and demodulated and decoded by an RX data processor 234. Receiver unit 232 may estimate the received signal quality (e.g., the received signal-to-noise ratio (SNR)) for each access terminal 120x and provide this information to access point 110x. Access point 110x may then derive the PC commands for each access terminal 120x such that the received signal quality for the access terminal 120x is maintained within an acceptable range. RX data processor 234 provides the recovered feedback information (e.g., the required transmit power) for each access terminal 120x to controller 220 and scheduler 230.

Scheduler 230 uses the feedback information to perform a number of functions, such as: (1) selecting a set of access terminals for data transmission on the reverse link and (2) assigning carriers to the selected access terminals. The carrier assignments for the scheduled access terminals are then transmitted on the forward link to these access terminals.

The techniques described herein for eliminating the use of a dedicated channel for providing acknowledgements (ACKs), for successful reception of a packet, on the forward link by combining the an ACK message with another message transmitted on a shared channel may implemented in various wireless multiple-access multi-carrier communication systems. For example, system 100 may be an OFDMA, CDMA, GSM, WCDMA, etc. system that utilizes data transmission.

For clarity, techniques are described herein for an OFDMA system that utilizes orthogonal frequency division multiplexing (OFDM).

In an exemplary OFDMA communication system, the forward link superframe comprises a superframe preamble portion followed by 6 PHYFrames portion. The superframe preamble portion comprises a plurality of channels, an Acquisition Channel (ACQCH), a Primary Broadcast Channel (pBCH) (also referred to an SYNC channel), a Quick Paging Channel (QPCH) and an Other Sector Interference Channel (OSICH). Each PHYFrame portion comprises a plurality of physical channels, a pilot one or more pilot channel (for example a Common Pilot Channel (CPICH) and, if present, an Auxiliary Pilot Channel (AuxPICH)), a Shared Signaling Channel (SSCH) for transmitting information that is processed by all access terminals receiving this channel, a Data Channel (DCH), a Secondary Broadcast Channel (sBCH), a Shared Data Channel (SDCH) and a Power Control Channel (PCCH).

In an embodiment, access point 110x uses a single channel on the forward link, for example the F-SSCH, to provide both the acknowledgement message and one or more assignment message. The F-SSCH channel is processed by all access terminals in communicating with the access point 110x. The access terminals sample or evaluate one or more portion of a received data on F-SSCH to and process only the data that is intended for it.

Figure 3A:
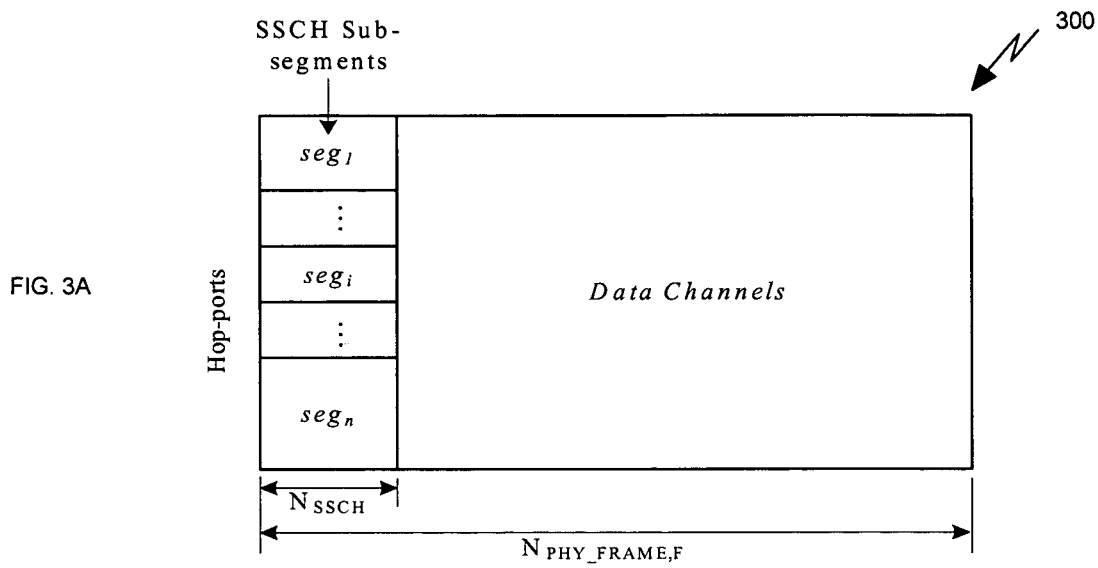
FIGS. 3A and 3B illustrate a structure of physical frame and a structure of sub-segment, respectively.
Figure 3B:
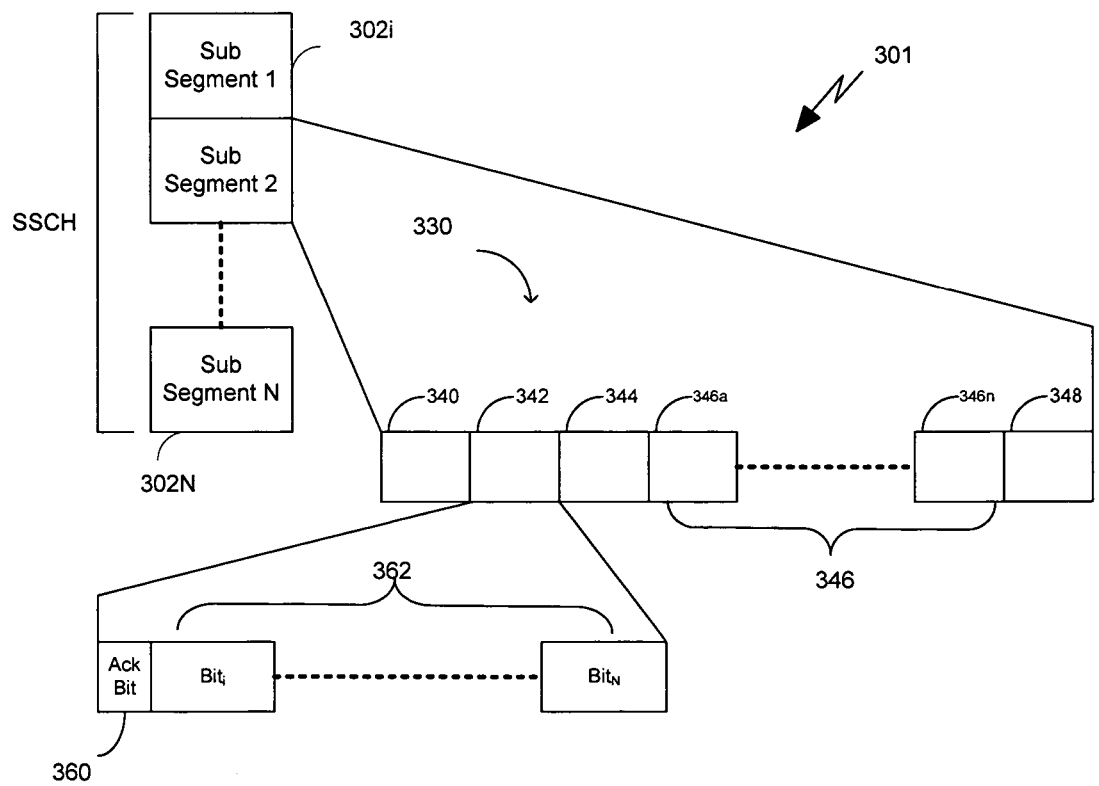

FIGS. 3A and 3B illustrate a structure of physical frame 300 and a structure of sub-segment 301, respectively. At the beginning of each physical frame, one or more OFDM symbols ($N_{SSCH}$) are allocated for the F-SSCH channel. $N_{SSCH}$ is determined by the controller based on system requirement. The F-SSCH consists of multiple sub-segments 302$i$ through 302N, as illustrated in FIG. 3B. Each sub-segment 302$i$-N comprises one encoded data packet 330*. In an embodiment, each packet 330 comprises a plurality of message portions comprising of a length information portion 340, ACK message portion 342, traffic to pilot transmit power ratio (T2P) message portion 344, a communication messages portion 346 and CRC portion 348.

T2P message portion 344 is a 6 bit field (T2P) that specifies the offset of the transmit power density of non-constant modulus modulation formats relative to the power density of a portion of ACQCH transmissions in the same sector. The offset is converted to a dB value as follows: offset=(T2P-31) *0.2 dB, where T2P is interpreted as unsigned integer.

The communication message portion 346 comprises a plurality of communication messages of varying length. Each message of the communication message portion 346 comprises a 3-bit message header, a channel id portion, MACID portion and one more packet format portions.

The communication message portion 346 may also comprise an access grant message that is sent in response to a detected access sequence transmission that allocates a MACID to the access terminal 120x and an initial ChID for use by the access terminal 120x. In addition, the access sequence ID that was transmitted to the access point 110x is provided to allow the access terminal 120x to discard access grant messages that do not contain the sequence that was transmitted by the message. Also, a TimingAdjust field is provided to inform the access terminal 120x of the timing offset to use for subsequent RL transmissions. The access terminal 120x shall advance its transmission timing by the amount: offset=(TimingAdjust−31)*8 chips, where TimingAdjust is interpreted as an unsigned integer.

The communication message portion 346 may also comprise Forward Link Assignment Message (FLAM). This message informs the access terminal 120x that holds a specific MACID that a FL ChID has been assigned to the access terminal 120x, and informs that access terminal 120x of the PF that should be used on this channel. The AN sets the Supplemental field in the message to '1' if the assignment should be added to the existing access terminal 120x assignment on the interlace, and to '0' if the assignment should replace any existing assignment on the interlace.

The communication message portion 346 may also comprise Reverse Link Assignment Message RLAM. This message informs the access terminal 120x that holds a specific MACID that a RL ChID has been assigned to the access terminal 120x, and informs that access terminal 120x of the PF that should be used on this channel. The access point 110x sets the Supplemental field in the message to '1' if the assignment should be added to the existing access terminal 120x assignment on the interlace, and to '0' if the assignment should replace any existing assignment on the interlace.

The communication message portion 346 may also comprise Multiple Code Word MIMO Forward Link Assignment Message MCWFLAM. This message informs the access terminal 120x that holds a specific MACID that a FL ChID has been assigned to the access terminal 120x, and informs that access terminal 120x of the PFs that should be used on up to $N_{FL\_ChID}$ MIMO layers of the channel. The access point 110x sets the Supplemental field in the message to '1' if the assignment should be added to the existing access terminal 120x assignment on the interlace, and to '0' if the assignment should replace any existing assignment.

The communication message portion 346 may also comprise Single Code Word MIMO Forward Link Assignment Message SCWFLAM. This message informs the access terminal 120x that holds a specific MACID that a FL ChID has been assigned to the access terminal 120x, and informs that access terminal 120x of the PF and the number of MIMO layers that shall be transmitted using the assignment. The AN sets the Supplemental field in the message to '1' if the assignment should be added to the existing access terminal 120x assignment on the interlace, and to '0' if the assignment should replace any existing assignment.

The communication message portion 346 may also comprise a message that indicates that a RL packet decode failed CRC check at the AN (Explicit NACK). This is an alternate to ACK Message, discussed below, for transmitting acknowledgement information to an access terminal 120x. The MACID field in the message specifies the access terminal 120x targeted by the message. The timing relationship between Explicit NACK transmission and the associated frame last demodulated prior to CRC check is that same as that for ACK information contained in the ACK Message.

The CRC portion 348 comprises CRC of all of the bits in the sub-segment packet (other than CRC). The access point 110x sets this field and the number of CRC bits in a packet 330 shall be equal to 8 if the number of information bits in the sub-segment is less than or equal to 60 bits. Otherwise, the CRC shall be 12 bits.

The ACK message portion 342 comprises an ACK message having a first portion 360 for an ACK indicator and a second portion 362 for an ACK information data pattern. The ACK indicator portion provides an indication as to whether there is an ACK message to process. Generally, the ACK indicator is a one-bit message. The ACK information data pattern is made up of several information bits. The number of information bits may depend on the number of users requiring an ACK for transmitted packet on RL. Thus, the length of the ACK message may be 0-n bits, wherein n is a threshold set by the system operator and varies based on number of ACKs to provide during a given frame. The ACK information data pattern may be generated using a first scheme wherein the information bits represent a series of bit packets, each bit packet identifying a access terminal 120x receiving an ACK. The ACK information data pattern may be generated using an alternate scheme, wherein the ACK information data pattern may be generated using an ACK compressing scheme discussed below.

Figure 4:
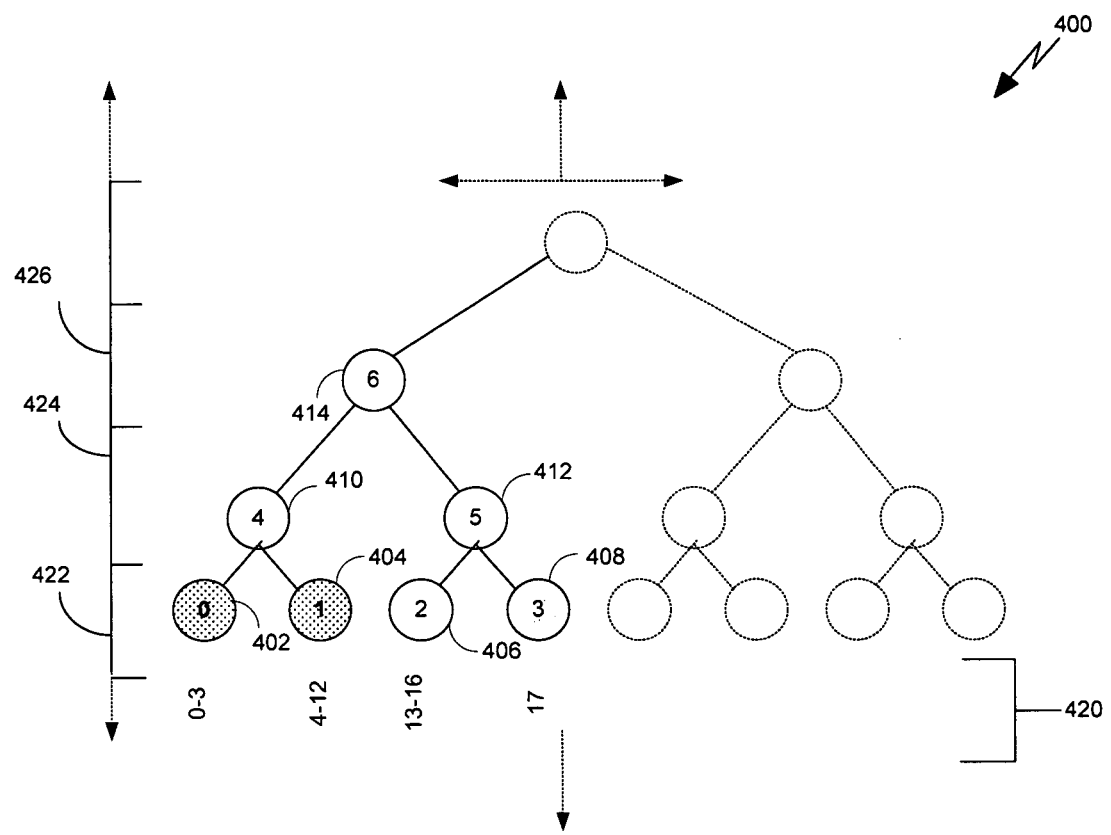
FIG. 4 illustrates a channel tree according to an embodiment.

FIG. 4 illustrates a channel tree 400 used in an ACK compression scheme according to an embodiment. The channel tree 400 is used to specify channel identification number (ChID) and sets of hop-ports 420 that are associated with each ChID. A set of hop-ports is said to be "mapped to a node" and a node "maps" a set of hop-ports. Hop-port is a fundamental unit of channel assignment. Each hop-port maps to one unique subcarrier. The mapping of hop-ports to subcarriers varies with time. A node corresponds to a single ChID. Children, Descendants are nodes that map a subset of the hop-ports mapped by a node. Parents, Ancestors are nodes that map a superset of the hop-ports mapped by a node. Base-nodes are nodes with no children. Base-nodes are assigned specific resources for example, hop-ports.

For exemplary purposes, 7 nodes 402, 404, 406, 408, 410, 412, and 414 are grouped by node level from 0 to $N_{NODE\_LEVELS}-1$, wherein each level comprises at least one node. Within a node-level, the nodes are sorted in ascending order by ChID. This creates an ordered list of ChIDs. Here, three node levels are used, first node level 422 having nodes 402, 404, 406, and 408 corresponding to ChID 0-3, second node level 424 having nodes 410 and 412 corresponding to ChID 4-5, and third node level 426 having node 414 corresponding to ChID 6. It should be noted that a node may have a plurality of children nodes and hop assignments 420 may vary, such that a node may map to a single hop port (for example, node 408). Also, ChID's may be associated with in a ascending format, wherein the highest node represents ChID 0 and ChID increase from left to right or right to left for each level. In order to implement the embodiment using the channel tree structure, how each node is associated may be dependent to operator of the system as long as transmitter and receiver of the ACK information data pattern is aware of the scheme used when the ACK information data pattern was generated. Thus, various schemes may be employed stemming from using a channel tree structure.

According to an example, a channel tree has 7 nodes, numbered from 0 to 6 and an 18 hop ports numbered 0-17. The base-nodes are ChIDs 1-3. Consider the node associated with ChID 5. This node has parent ChID 6 and children ChIDs 2 and 3. The node maps 5 hop-ports, namely hop-ports 13-17. The number of node levels is determined by the access point 110x and communicated to each access terminal 120x in communication with the access point 110x. According to the example, three levels are used. For example, a first mobile access terminal 120b is assigned a ChID 1, is considered to be mapped to node 404, hop ports 4-12, and node 410 as the highest node. A second mobile access terminal 102d is assigned a ChID 3, is considered to be mapped to node 408, hop ports 17, and node 412 as the highest node. Because nodes define orthogonal channel assignments, the use of a node in the tree can restrict use of other nodes. Thus, if a node is in use, then all descendants and ancestors of the node are unavailable for use and are called "restricted" nodes. Therefore, node 414, in the example may not be assigned to any other terminal but terminal having a ChID 6, according this example.

In an embodiment, a one-to-one ascending scheme is used to associate each bit to an access terminal. Each bit, having a value of 0 or 1 representing an NACK or ACK, respectively. Each bit is part of the ACK information data pattern received by the each access terminals communicating with the access point. The access point 110x builds the ACK information data pattern based on packets received from one or more terminal, each having an assigned channel ID. Various methods may be employed to generate the ACK information data pattern, which identifies the targeted terminal for which the ACK is intended. Here, the ACK message would have 7 bits, each mapped to a ChID 0-6, incremental from left to right. Thus, if access point 110x is sending an ACK for RL traffic to first terminal 102b (also referred to as ACK requesting entity) having ChID 1 and to the second terminal 10d having ChID 3, access point 110x would generate a ACK information data pattern "0101000" for the ACK message.

Acknowledgements for RL traffic sent in RL physical frame i, are encoded in the encoded data packet 330 and sent in the SSCH in the FL-physical frame i+2. For each SSCH sub-segment 302 that passes CRC the terminal checks the ACK indicator 360, generally a one-bit field. If the ACK indicator 360 is set (for example set to 1) then each terminal processes the ACK information data pattern 362.

All access terminals receiving the ACK message evaluates the ACK information data pattern provided in ACK Message and determines if it's ChID or other identifier is represented in the ACK information data pattern. For example, access terminal 102b having ChID of 1, after decoding the message and extracting the ACK message {0101000}, access terminal 102b will evaluate the second bit from left. If bit value is 1, then terminal assumes an explicit ACK was received and continues normal processing. Otherwise, the terminal may assume that an implicit NACK was provided an either retransmits the data or indicates an error or loss of resource.

Figure 5:
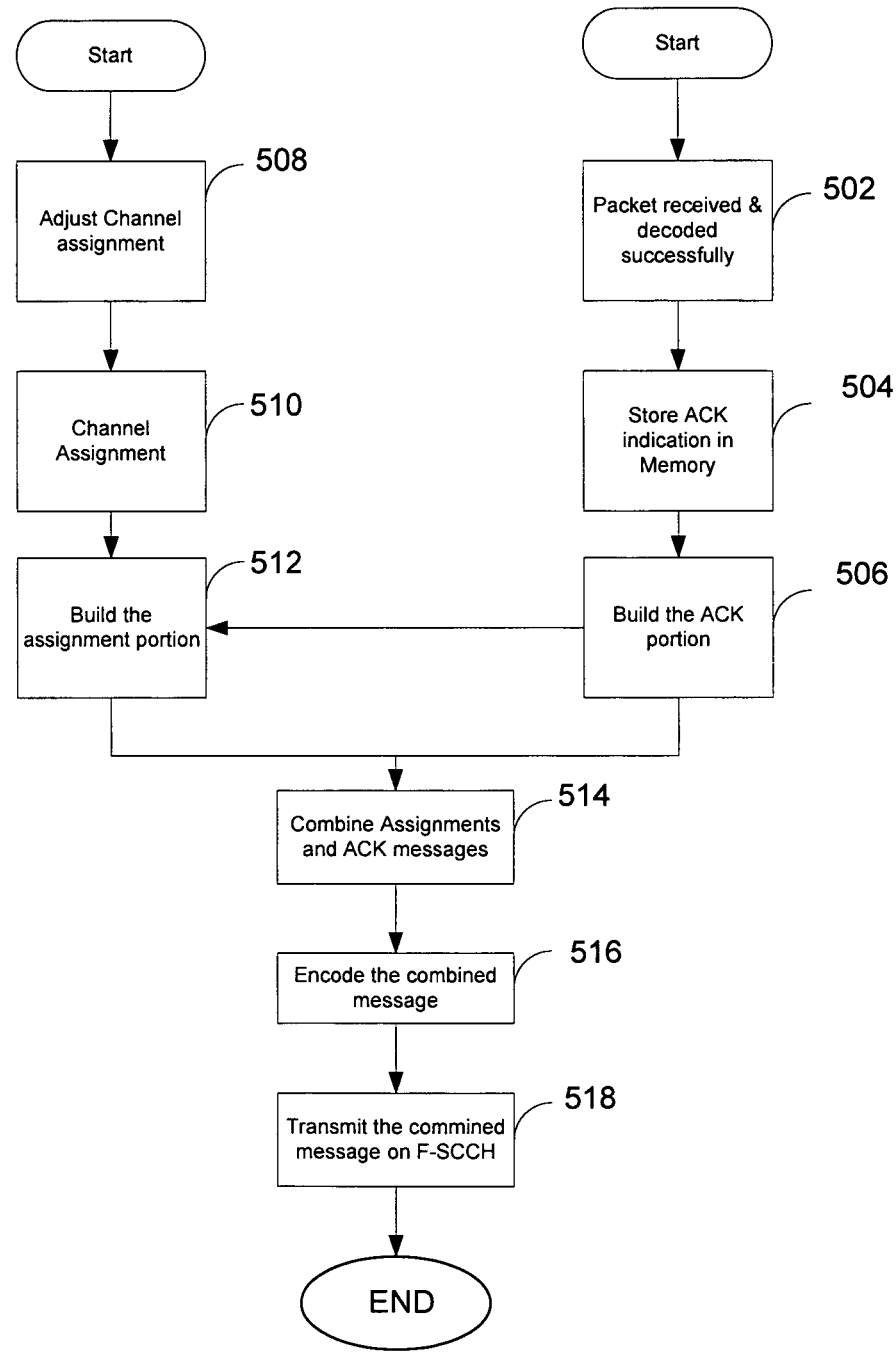
FIG. 5 illustrates a process for combining assignment messages and ACK messages according to an embodiment.

FIG. 5 illustrates a process 500, for combining assignment messages and ACK messages according to an embodiment. The AP 110x is configured to execute steps of the process 500 by utilizing at least one of various components described in FIG. 2 for example, the controller 220, the scheduler 230, the memory 222, the TX data processor 214, RX data processor 234, etc. At step 502, determine if a packet was received by RX data processor 234 from an access terminal 120x in communication with access point 110x and determine if the received packet was decoded successfully. If so, then at step 504, update a database stored in memory 222 that stores information regarding each terminal transmitting data to the access point 110x. The access point 110x may employ various techniques, for example the first scheme (for example, the one-to-one ascending scheme) discussed above, in collecting and managing the ACKs. At step 506, the access point 110x builds the ACK message portion 342 of the sub segment packet 330. If at least one ACK is required to be transmitted then set the bit for ACK indicator to 1. At step 506, start building the ACK information data packet or adjust the existing ACK information data pattern to add the information about the access terminal which sent packet at step 502.

Generally, in a communication system, such as OFDMA, the access terminals use the reserve link to request an assignment of resources. If requested resources are granted, then the resource assignments are transmitted on the forward link. In addition, one or more shared channels are used to communicate data to the access terminals on the forward link. In order to receive information on the shared channel, access terminal requires assignment information to receive data on the shared channels. All the access terminals in communication with the access point 110x, will process the information received on these shared channel. In a multicast/broadcast system, these channels are used to provide data that is intended for all the access terminals, for example new data or advertisements. The use of shared channel provides a low overhead and saves valuable bandwidth that is available to the system.

In an embodiment, the processing of the assignment request may occur concurrently with setting up the ACK message. Referring back to the process 500, at step 508, receive an assignment request from one or more access terminals at the TX data processor 214 and process the assignment request. At step 510, the access point 110x adjusts the channel assignment. The access point 110x determines the assignment of resources using the scheduler 230. At step 512, incorporate the channel assignment into the communication message portion 346. In an embodiment, the access point 110x uses information regarding the ACK message, generated at step 506, to determine if any channel assignment needs adjusting. If the size of the ACK information data pattern 362 is longer than a preset threshold, the access point 110x may use sticky assignment in order to maintain efficiency of the system. At step 514, combine the ACK message built in step 506 and the communication message having the new assignment, built in step 512 to generate the encoded data packet 330. As discussed above the encoded data packet 330 comprises the ACK message, a communication portion 346 having one or more assignment portions and a CRC portion used for encoding. At step 516, encode the entire encoded data pattern 330 that includes the ACKs, is encoded using a CRC. At step 518, the encoded data pattern 330 is transmitted on a forward link for example, F-SSCH discussed above.

Figure 6:
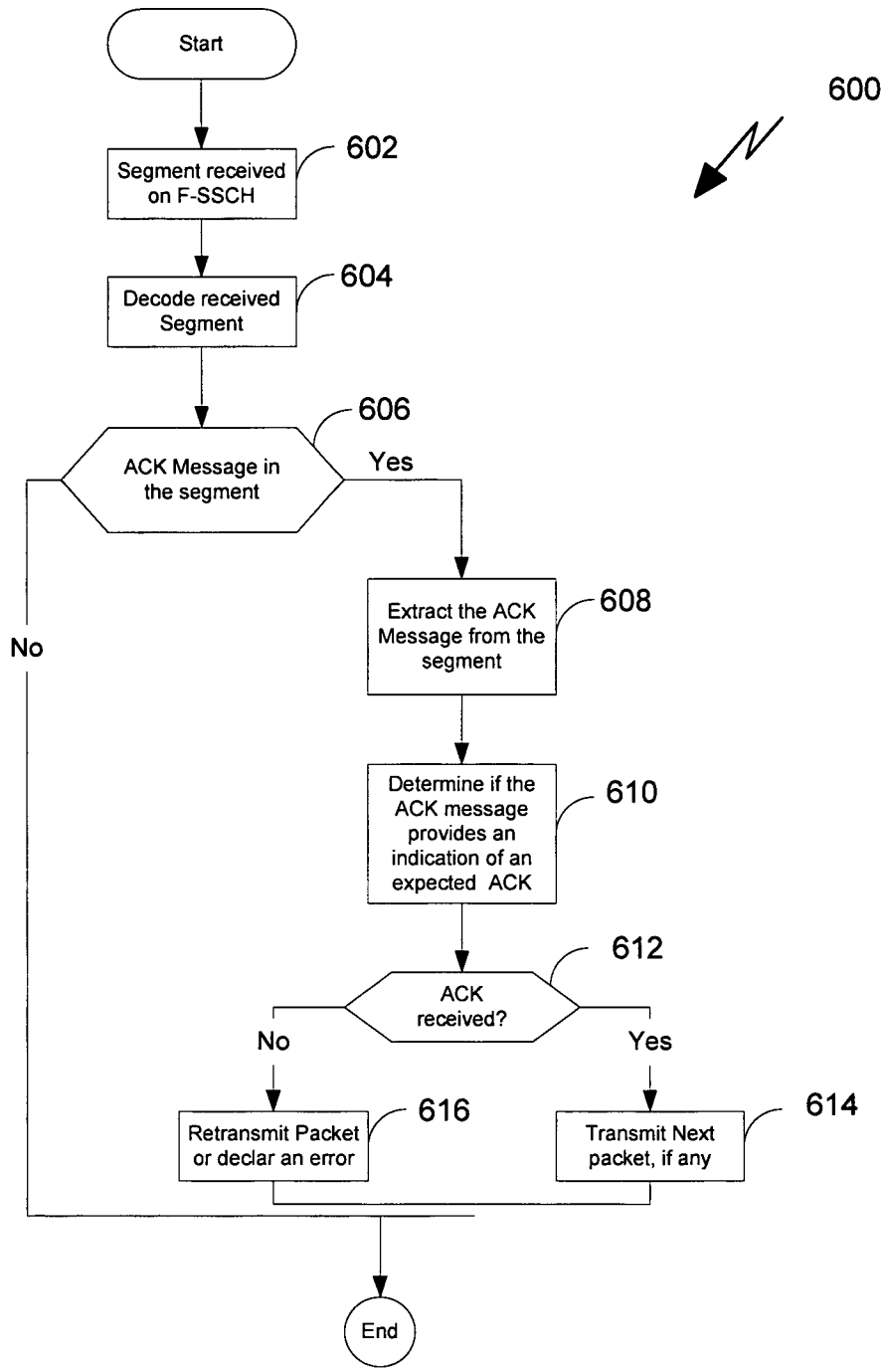
FIG. 6 shows a process for processing a message having a combined ACK message.

FIG. 6 shows a process 600 is executed by each terminal, for example 120x, in communication system with the access point 110x. The controller 260 is configured to execute steps of the process 600 by utilizing various components of access terminal 120x, for example, the scheduler 260, the memory 262, the TX data processor 274, RX data processor 256, etc. At step 602, receive the encoded data packet 330 from the access point 110x. At step 604, the controller 260 decodes the received data packet 330 and determines if a correct packet was received. At step 606, extract the ACK message portion 342 from the successfully decoded data packet 330. This may be performed by assigning a portion of received data packet 330 as ACK message portion. Thereafter, the controller 260 determines if the value of the bit represented in the first portion 360 is 1. If so, the controller 260 concludes that ACK information is available in second portion 362 of the encoded data packet 330 and executes step 608. At step 608, the require information is extracted from the second portion 342 to form an ACK information data pattern. As discussed above, the number of bits making up the ACK information data pattern varies based on number of ACKs provided in an encoded data packet and method used by the access point 110x to generate the message. At step 610, controller 260 determines if the ACK information data pattern provides an indication of an expected ACK. According to the example discussed above, the ACK information data pattern would be {0101000}. For example, the access terminal 110x having a ChID 1, would evaluate ACK information data pattern 362 and determine that this ACK information data pattern contains a ACK targeted for itself. At step 610, the ACK information data pattern is evaluated to determine if an ACK is provided for the access terminal 110x.

All access terminals that are in communication with the access point has knowledge of the rules associated with the scheme used by the access point 110x (e.g. rules used to build the ACK information data pattern for the first scheme). The rules may be stored in memory 262 and accessed by the controller 260 to determine if an ACK was received for itself. At step 612, if determined that an ACK was received, then at step 614, transmit the next data packet, if any are required transmission on the RL. Otherwise, at step 616, the controller 260 retransmits the data packet or if the maximum allowable retransmissions of data packets per HARQ scheme are exhausted, then the controller 260 generates an error message to indicate an error in transmission.

The techniques described herein may be implemented by various means. For example, these techniques may be implemented in hardware, software, or a combination thereof. For a hardware implementation, the processing units (e.g., controllers 220 and 260, TX processors 214 and 274, RX processors 234 and 256, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units (e.g., memory 222 in FIG. 2) and executed by processors (e.g., controllers 220). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of providing an acknowledgement (ACK) to one or more recipients using a single channel, the method comprising acts of:
    generating an ACK message having an ACK information data pattern, wherein a length of the ACK information data pattern is based on a number of recipients to receive ACKs;
    embedding said ACK information data pattern into a data packet having a communication message portion including one or more assignment messages, each of the one or more assignment messages configured to assign a resource to a given recipient; and
    transmitting said data packet on the single channel,
    wherein the one or more assignment messages include a channel assignment message.

2. The method as claimed in claim 1, wherein said generating said ACK message comprises generating an ACK indicator.

3. The method as claimed in claim 2, wherein said generating said ACK message comprises generating an ACK indicator which provides an indication of whether said ACK message has any information in said ACK information data pattern.

4. The method as claimed in claim 2, wherein said generating said ACK information data pattern comprises using a length based on a number of ACKs to be transmitted.

5. The method as claimed in claim 2, wherein said generating said ACK information data pattern comprises associating an ACK with a channel ID of a first terminal.

6. The method as claimed in claim 2, wherein said generating said ACK information data pattern comprises selecting a scheme from a predetermined set of schemes to generate said ACK information data pattern.

7. The method of claim 1, wherein the one or more assignment messages include one or more of (i) a Forward Link Assignment Message (FLAM), (ii) a Reverse Link Assignment Message (FLAM), (iii) a Multiple Code Word Multiple-Input Multiple-Output (MIMO) FLAM (MCWFLAM) and/or (iv) a Single Code Word MIMO FLAM (SCWFLAM).

8. The method of claim 1, wherein the one or more assignment messages include at least one sticky assignment.

9. The method of claim 1, wherein the channel assignment message assigns one or more hop-ports to the given recipient.

10. A method of providing an acknowledgement (ACK) message combined with one or more communication messages of a data packet that is transmitted using a single channel, the method comprising:
associating an ACK with a channel ID of a recipient;
building an ACK information data pattern, wherein a length of the ACK information data pattern is based on a number of recipients to receive ACKs;
combining the ACK information data pattern with one or more assignment messages by applying an encoding scheme over the combined message, each of the one or more assignment messages configured to assign a resource to a given recipient; and
transmitting the combined message,
wherein the one or more assignment messages include a channel assignment message.

11. A method, comprising:
receiving an acknowledgement (ACK) message embedded in a segment received on a downlink shared channel of a communication system;
determining that an ACK information data pattern is included in the segment, wherein the segment includes a communication message portion including one or more assignment messages and wherein a length of the ACK information data pattern is based on a number of recipients to receive ACKs, each of the one or more assignment messages configured to assign a resource to a given recipient;
extracting said ACK message from the segment when said ACK information data pattern is included in the segment; and
determining that the ACK information data pattern contains an expected ACK for a targeted recipient in communication on the shared channel,
wherein the one or more assignment messages include a channel assignment message.

12. The method as claimed in claim 11, further comprising evaluating said ACK message using an ACK information data pattern generating scheme.

13. A method, comprising:
receiving an acknowledgment (ACK) message on a downlink shared channel of a communication system, the ACK message included within a segment that also includes a communication message portion including one or more assignment messages, each of the one or more assignment messages configured to assign a resource to a given recipient;
evaluating a first portion of the ACK message to determine that a second portion of the same ACK message should be processed;
processing said second portion of said ACK message to evaluate an ACK information data pattern, wherein a length of the ACK information data pattern is based on a number of recipients to receive ACKs; and
determining that an expected ACK is represented in said ACK information data pattern,
wherein the one or more assignment messages include a channel assignment message.

14. The method as claimed in claim 11, further comprising evaluating said ACK message using a first scheme.

15. An apparatus for providing an acknowledgement (ACK) to one or more recipients using a single channel, the method comprising:
means for generating an ACK message having an ACK information data pattern, wherein the ACK information data pattern is based on a number of recipients to receive ACKs;
means for embedding said ACK information data pattern into a data packet having a communication message portion including one or more assignment messages, each of the one or more assignment messages configured to assign a resource to a given recipient; and
means for transmitting said data packet on the single channel,
wherein the one or more assignment messages include a channel assignment message.

16. The apparatus as claimed in claim 15, wherein said means for generating said ACK message comprises means for generating an ACK indicator.

17. The apparatus as claimed in claim 16, wherein said means for generating said ACK message further comprises means for generating an ACK indicator which provides an indication of whether said ACK message has any information in said ACK information data pattern.

18. The apparatus as claimed in claim 17, wherein said means for generating said ACK information data pattern comprises means for using a length this is based on a number of ACKs to be transmitted.

19. The apparatus as claimed in claim 17, wherein said means for generating said ACK information data pattern comprises means for associating an ACK with a channel ID of a first terminal.

20. The apparatus as claimed in claim 17, wherein said means for generating said ACK information data pattern comprises means for selecting a scheme from a predetermined set of schemes to generate said ACK information data pattern.

21. An apparatus for providing an acknowledgement (ACK) message combined with one or more communication messages of a data packet that is transmitted using a single channel, the method comprising:
means for associating an ACK with a channel ID of a recipient;
means for building an ACK information data pattern, wherein a length of the ACK information data pattern is based on a number of recipients to receive ACKs;
means for combining the ACK information data pattern with one or more assignment messages by applying an encoding scheme over the combined message, each of the one or more assignment messages configured to assign a resource to a given recipient; and
means for transmitting the combined message,
wherein the one or more assignment messages include a channel assignment message.

22. An apparatus comprising:
- means for receiving an acknowledgement (ACK) message embedded in a segment received on a downlink shared channel of a communication system, the segment further including a communication message portion including one or more assignment messages, each of the one or more assignment messages configured to assign a resource to a given recipient;
- means for determining that an ACK information data pattern is included in the segment, wherein a length of the ACK information data pattern is based on a number of recipients to receive ACKs;
- means for extracting said ACK message from the segment when said ACK information data pattern is included in the segment; and
- means for determining that the ACK information data pattern contains an expected ACK for a targeted recipient in communication on the shared channel,
- wherein the one or more assignment messages include a channel assignment message.

23. The apparatus as claimed in claim 22, further comprising means for evaluating said ACK message using an ACK information data pattern generating scheme.

24. The apparatus as claimed in claim 22, further comprising means for evaluating said ACK message using a first scheme.

25. An apparatus, comprising:
- means for receiving an acknowledgment (ACK) message on a downlink shared channel of a communication system, the ACK message included within a segment that also includes a communication message portion including one or more assignment messages, each of the one or more assignment messages configured to assign a resource to a given recipient;
- means for evaluating a first portion of the ACK message to determine that a second portion of the same ACK message should be processed;
- means for processing said second portion of said ACK message to evaluate an ACK information data pattern, wherein a length of the ACK information data pattern is based on a number of recipients to receive ACKs; and
- means for determining that an expected ACK is represented in said ACK information data pattern,
- wherein the one or more assignment messages include a channel assignment message.

26. A non-transitory computer-readable medium storing a computer program, wherein the program contains instructions for:
- generating an acknowledgement (ACK) message having an ACK information data pattern, wherein a length of the ACK information data pattern is based on a number of recipients to receive ACKs;
- embedding said ACK information data pattern into a data packet having a communication message portion including one or more assignment messages, each of the one or more assignment messages configured to assign a resource to a given recipient; and
- transmitting said data packet on the single channel,
- wherein the one or more assignment messages include a channel assignment message.

27. The non-transitory computer-readable medium as claimed in claim 26, further comprising executable instructions for generating an ACK indicator which provides an indication of whether said ACK message has any ACK in said ACK information data pattern.

28. The non-transitory computer-readable medium as claimed in claim 26, further comprising executable instructions for generating said ACK information data pattern comprises using a length based on a number of ACKs to be transmitted.

29. The non-transitory computer-readable medium as claimed in claim 26, further comprising executable instructions for generating said ACK information data pattern comprises associating an ACK with a channel ID of a recipient.

30. The non-transitory computer-readable medium as claimed in claim 26, further comprising executable instructions for selecting a scheme from a predetermined set of schemes to generate said ACK information data pattern.

31. A non-transitory computer-readable medium storing a computer program, wherein the program contains instructions for:
- associating an acknowledgement (ACK) with a channel ID of a recipient;
- building an ACK information data pattern, wherein a length of the ACK information data pattern is based on a number of recipients to receive ACKs;
- combining the ACK information data pattern with one or more assignment messages by applying an encoding scheme over the combined message, each of the one or more assignment messages configured to assign a resource to a given recipient; and
- transmitting the combined message,
- wherein the one or more assignment messages include a channel assignment message.

32. A non-transitory computer-readable medium storing a computer program, wherein the program contains instructions for:
- receiving an acknowledgement (ACK) message embedded in a segment received on a downlink shared channel of a communication system, the segment further including a communication message portion including one or more assignment messages, each of the one or more assignment messages configured to assign a resource to a given recipient;
- determining that an acknowledgement (ACK) information data pattern is included in the segment, wherein a length of the ACK information data pattern is based on a number of recipients to receive ACKs;
- extracting an ACK message from the segment when said ACK information data pattern is included in the segment; and
- determining that the ACK information data pattern contains an expected ACK for a targeted recipient in communication on the shared channel,
- wherein the one or more assignment messages include a channel assignment message.

33. The non-transitory computer-readable medium as claimed in claim 32, further comprising executable instructions for evaluating said ACK message using an ACK information data pattern generating scheme.

34. The non-transitory computer readable medium as claimed in claim 32, further comprising executable instructions for evaluating said ACK message using a first scheme.

35. A non-transitory computer-readable medium storing a computer program, wherein the program contains instructions for:
- receiving an acknowledgment (ACK) message on a downlink shared channel of a communication system, the ACK message included within a segment that also includes a communication message portion including one or more assignment messages, each of the one or more assignment messages configured to assign a resource to a given recipient;

evaluating a first portion of the ACK) message to determine that a second portion of the same ACK message should be processed;

processing said second portion of said ACK message to evaluate an ACK information data pattern, wherein a length of the ACK information data pattern is based on a number of recipients to receive ACKs; and determining that an expected ACK is represented in said ACK information data pattern, wherein the one or more assignment messages include a channel assignment message.

36. In a wireless communication system, an apparatus comprising:

an electronic device, said electronic device configured:

to generate an acknowledgement (ACK) message comprising an ACK information data pattern, wherein a length of the ACK information data pattern is based on a number of recipients to receive ACKs;

to embed said ACK information data pattern into a data packet having a communication message portion including one or more assignment messages, each of the one or more assignment messages configured to assign a resource to a given recipient; and to transmit said data packet using a single channel, wherein the one or more assignment messages include a channel assignment message.

37. The apparatus as claimed in claim 36, wherein said ACK message comprises an ACK indicator.

38. The apparatus as claimed in claim 36, wherein said electronic device is further configured to select a scheme from a predetermined set of schemes.

39. In a wireless communication system, an apparatus comprising:

an electronic device, said electronic device configured:

to associate an ACK with a channel ID of a recipient;

to build an ACK information data pattern, wherein a length of the ACK information data pattern is based on a number of recipients to receive ACKs;

to combine the ACK information data pattern with one or more assignment messages by applying an encoding scheme over the combined message, each of the one or more assignment messages configured to assign a resource to a given recipient; and to transmit the combined message, wherein the one or more assignment messages include a channel assignment message.

40. In a wireless communication system, an apparatus comprising:

an electronic device, said electronic device configured:

to receive an acknowledgement (ACK) message embedded in a segment received on a shared channel of a communication system;

to determine that an ACK information data pattern in is included in the segment, wherein the segment includes a communication message portion including one or more assignment messages and wherein a length of the ACK information data pattern is based on a number of recipients to receive ACKs, each of the one or more assignment messages configured to assign a resource to a given recipient;

to extract said ACK message from the segment when said ACK information data pattern is included in the segment; and to determine that the ACK information data pattern contains an expected ACK for a targeted recipient in communication on the shared channel, wherein the one or more assignment messages include a channel assignment message.

41. The apparatus as claimed in claim 40, wherein the electronic device is further configured to evaluate said ACK message using an ACK information data pattern generating scheme.

42. In a wireless communication system, an apparatus comprising:

an electronic device, said electronic device configured:

to handle an acknowledgement (ACK) message embedded in a segment received on a shared channel of a communication system, the segment further including a communication message portion including one or more assignment messages, each of the one or more assignment messages configured to assign a resource to a given recipient;

to evaluate a first portion of the ACK message to determine that a second portion of the same ACK message should be processed;

to process said second portion of said ACK message to evaluate an ACK information data pattern, wherein a length of the ACK information data pattern is based on a number of recipients to receive ACKs; and to determine that an expected ACK is represented in said ACK information data pattern, wherein the one or more assignment messages include a channel assignment message.

43. The apparatus as claimed in claim 42, wherein the electronic device is further configured to evaluate said ACK message using a first scheme.

44. A communication system, the system comprising:

a first electronic device:

to generate an acknowledgement (ACK) message comprising an ACK information data pattern, wherein a length of the ACK information data pattern is based on a number of recipients to receive ACKs;

to embed said ACK information data pattern into a data packet having a communication message portion including one or more assignment messages, each of the one or more assignment messages configured to assign a resource to a given recipient; and to transmit said data packet using a single channel, wherein the one or more assignment messages include a channel assignment message.

45. The communication system, as claimed in claim 44, further comprising a second electronic device configured to receive said ACK information data pattern embedded in said data packet.

46. A method of providing an acknowledgement (ACK) to one or more communication devices communicating in accordance with Hybrid Automatic Repeat Request (H-ARQ) protocols, comprising:

generating an ACK information data pattern to acknowledge, to one or more communication devices, whether at least one data packet has been received on a given channel, the ACK information data pattern configured to have a length that scales based on the number of the one or more communication devices to inform of the acknowledgment such that the ACK information data pattern has a first length if the number of the one or more communication devices is one and the ACK information data pattern has a second length that is longer than the first length if the number of the one or more communication devices is more than one;

embedding the ACK information data pattern into a data packet having a communication message portion including one or more assignment messages, each of the one or more assignment messages configured to assign a resource to a given recipient; and transmitting the data packet with the embedded ACK information to the one or more communication devices over the given channel, wherein the one or more assignment messages include a channel assignment message.

47. The method of claim 46, wherein the ACK information data pattern includes a number of bits corresponding to the number of the one or more communication devices, with each bit set to indicate whether one data packet from one of the communication devices was received or not received.

48. The method of claim 46, wherein the transmitting step transmits in a downlink direction.

49. A method of providing acknowledgments (ACKs), comprising:

configuring an ACK message to provide an ACK information data pattern that functions to acknowledge data received from multiple communication devices;

combining the ACK message with one or more assignment messages that are each configured to assign a resource to a given recipient; and transmitting the combined message within a packet on a downlink shared channel that is expected to be monitored at least by the multiple communication devices, wherein the one or more assignment messages include a channel assignment message.

\* \* \* \* \*